UNITED STATES PATENT OFFICE.

LUDWIG BEREND, OF AMÖNEBURG-ON-THE-RHINE, GERMANY.

METHOD OF MANUFACTURING PHENOL-ALDEHYDE RESINS SOLUBLE IN OIL, AND VARNISHES THEREFROM.

1,205,081.  Specification of Letters Patent.  Patented Nov. 14, 1916.

No Drawing.  Application filed June 1, 1915. Serial No. 31,555.

*To all whom it may concern:*

Be it known that I, LUDWIG BEREND, chemist, citizen of Germany, subject of the King of Prussia and Emperor of Germany, residing at Landgrabenweg 14, Amöneburg-on-the-Rhine, in the Kingdom of Prussia and Empire of Germany, have invented new and useful Improvements in Methods of Manufacturing Phenol-Aldehyde Resins Soluble in Oil, and Varnishes Therefrom, of which the following is a specification.

The resins obtainable in the known manner from phenols and aldehydes preferably formaldehyde or substances splitting off formaldehyde are either soluble and meltable or insoluble in the known solvents and not meltable. Between these there are intermediate substances which will swell in various solvents and soften on heating but which are not meltable. According to the condensation media employed, the quantity of aldehyde and the longer or shorter the period of heating, the soluble and meltable resins behave very diversely relatively to the several solvents and only very isolated reaction products have hitherto been discovered that are more or less soluble in fatty oils. It is however precisely its solubility in oil that gives a resin its greatest importance owing to its use in the manufacture of oil varnishes particularly when its other properties approximate in value the properties of the fossil copals. The phenol resins which to a certain extent are readily soluble in oils are readily saponifiable bodies of small resistance, while the resins soluble with difficulty present somewhat better properties. The gravest defect of all the phenol resins soluble in oil hitherto known which renders them unsuited for the manufacture of useful oil varnishes, resides in the fact that they are not soluble in turpentine oil and benzin and are therefore again precipitated by these diluents from solutions in fatty oils. It is true that some resins are known that are soluble in turpentine oil, but not in linseed oil or in other fatty oils or in benzin and similarly there are resins soluble in fatty oils but completely insoluble in turpentine oil and benzin.

In accordance with German Patent No. 254411, French Patent No. 441547 and British Patent No. 1269/1912 it is true that phenol aldehyde resins can be obtained that are soluble in fatty oils and are not precipitated by turpentine oil when natural resins, balsams and so forth are employed as contact media, still it is not all the resins obtainable by the processes there described that are soluble in fatty oils and turpentine oil and they are reprecipitated by benzin in the same way as is the case with the phenol resins that are soluble in fatty oils, particularly when only small quantities of natural resins have been employed in the condensation.

Now I have found that all phenol aldehyde resins are convertible into resins soluble in oil very suitable for the manufacture of oil varnishes if they are first of all melted with natural or also artificial resins or fatty oils or a mixture thereof, until a drop upon a glass plate sets into a mass remaining perfectly clear when cold and a sample after boiling in fatty oil is no longer precipitated from the solution formed thereby even when turpentine oil or benzin are added. If a phenol resin be melted with a resin, a resinous mixture, which appears to be homogeneous, is very speedily obtained but after setting in a cold state, such a mixture generally remains slightly opalescent and only acquires the properties characterized above after prolonged heating when apparently a transposition or conversion takes place. The proof of such transposition is furnished by the fact that in melting phenol resins and colophony the acid number ascertained by titration prior to the melting has fallen very considerably after the melting process has been carried out so that the resins obtained present much greater resistance to alkalis than was to be anticipated. Another very surprising fact which further goes to prove the above assertions, is that even the hard phenol resins meltable with difficulty or unmeltable can in this manner be reconverted into meltable resins soluble in oil by lengthy heating with natural resins at normal or increased pressure; an increased duration of the reaction is necessary to attain this result however. This surprising and extremely valuable phenomenon, by the addition of suitable resins also serves to prevent the readily arising formation of unmeltable and insoluble products in the action of formaldehyde on phenols, which is also of great importance. In point of fact this takes place completely so that it is possible to obtain only soluble and meltable resins under all circumstances.

The meltable resins obtained from the unmeltable resins in the indicated manner can of course be reutilized as additions to fresh reaction masses which shall be converted into unmeltable hard resins, waste arising in the mechanical treatment of such unmeltable resin products advantageously being employed in this manner.

In order to obtain oil varnishes from phenol aldehyde resins which can be thinned with turpentine oil or benzin the resinous masses soluble in oils or obtained in the manner described above by melting with oils or resins, are boiled with the quantity of fatty oil required for the solution, the temperature being allowed to rise gradually until at approximately 300° C. a vigorous reaction commences the heating being continued until a solution remaining clear even in a cold state is no longer clouded by benzin and turpentine oil. If this precautionary measure be not adopted and heating is only effected until clear solution in oil which in the case of some resins, occurs very speedily, an oil solution suitable for varnish purposes is not obtained. The varnishes obtained in the manner indicated above on the contrary can be mixed even with double the quantity of turpentine oil, benzin and similar varnish diluents without the resin being separated, and in this manner varnish coats of the greatest permanency are obtained which are not inferior to the best copal varnishes. The varnishes adapted to be highly diluted obtainable in this manner also render it possible to manufacture valuable immersion varnishes from phenol resins. The cause of the reactions in connection with the melting with oils or resin and to boiling with oils that have been described above, may be disregarded at all events for the present, but it is certain that changes take place as shown by the modified acid numbers of the resins. An essential condition for the manufacture of the varnish is the previous melting out of the phenol resins with resins or oils or a mixture thereof, and, as stated above, it is not sufficient in this operation to effect merely a melting together of phenol resin and natural resin, but the melting out must be carried to a well defined final point, which is advantageously ascertained by dropping test quantities on glass plates and by boiling with oils and thinning with benzin or turpentine oil. Moreover, the heating of the resinous masses with the fatty oil until the entering of the reaction leading to homogeneous permanent solution is equally important, whereupon the varnish can be again thinned and worked up in the usual manner.

It is also possible in accordance with the novel process to utilize to a greater or less extent all resins obtainable from the most diverse phenols without regard to the contact media employed, but those manufactured without contact media or with natural resins, balsams, oils and so forth have proved to be particularly suitable. Of the resins employed in the melting, colophony, turpentine resin, copals, coumarin resins hardened and esterified resins have been found to be particularly suitable, but many other resins and mixtures thereof can be employed with advantage. In the manufacture of the varnish all fatty oils presenting practical importance in connection with varnish can be employed, particularly linseed oil and Chinese wood oil.

The novel process also furnishes an advantage which must not be under estimated inasmuch as phenol-resin-copal-varnishes of high value can be manufactured, wherein the difficult and troublesome melting out or purifying of the copals by melting is largely accelerated and simplified by the presence of the phenol resins. The melted mass is entirely homogeneous and completely presents the character of melted out resin yielded by high grade copals, the product being also largely cheapened. Also in this case it must also be borne in mind that it is not possible to obtain a utilizable product by the simple melting together of the resins, but it is necessary to carry out a long, careful melting process up to the point at which a test quantity dropped onto a cold glass plate sets into a clear transparent and hard resin which, after boiling in oils, in the manner described above, is not precipitated by benzin.

If only fatty oil be employed in the first melting of the phenol resins only the minimum quantity should be used in order to obtain as the final product also a solid resin remaining perfectly clear when cold.

The examples furnished above are quite general and, as will be understood in connection with the preparation of resins for varnish purposes, can be modified in various ways. If it be desired to add oil or resin to the condensation mixtures for the manufacture of phenol resins from the commencement or in the course of the condensation for the purpose of manufacturing the oil solution, heating must be carried out until a test drop sets clear in a cold state, whereupon the boiling in fatty oils should be effected as already mentioned. It will of course be understood that the resins melted in accordance with the first melting process are utilizable alone without fatty oils with other solvents. The operation may also be carried out by melting the phenol resins with a small quantity of fatty oil until a resinous mass remaining clear in a cold state is obtained whereupon this can be boiled with fatty oil in adding other resins. A useful product can also be obtained when the phenol resins are boiled with an appropriate other resin and oils until a vigorous reaction has taken place, a drop of the resultant varnish remains completely clear in a cold state and an oil varnish that is not clouded by benzin is produced. These latter methods are not so advisable however.

*Examples.*

1. 100 grams of a resin insoluble in fatty oils but yet meltable obtained by condensation of 100 grams of crude phenol and 35 grams of trioxymethylene are heated with 100 grams of colophony for half an hour to 210 to 220° C. until a resinous mass completely transparent in a cold state is produced and which if boiled for some time with linseed oil at approximately 300° C. is not precipitated when turpentine oil or benzin is added.

2. 100 grams of carbolic acid are heated with 80 grams of formaldehyde of 40% by weight and half a gram of hydrochloric acid for several hours to 115° C. until a resinous mass setting when cold is formed. The liquid remaining above the resinous mass is then poured off and melting is effected with 20 grams of wood oil and 20 grams of coumarin resin until a resin remaining clear when cold and utilizable for an oil varnish is obtained.

3. 100 grams of unmeltable hard resin obtained from 100 grams of cresol and 30 grams of paraformaldehyde are pulverized as finely as possible, introduced into 100 grams of molten colophony and the mixture heated for approximately 3 hours at 300° C. and five atmospheres pressure in digesters. The resultant resin is transparent, melts at approximately 150° C. and dissolves completely in fatty oils.

4. 100 grams of phenol aldehyde resin are melted with 50 grams of colophony until a homogeneous resin remaining clear in a cold state is produced; this is heated with 180 grams of linseed oil and then while stirring is gradually heated to approximately 300° C. until a reaction rendering itself evident by vigorous formation of scum is completely ended and no clouding occurs when turpentine oil or benzin is added. Cooling to approximately 150° C. is then allowed to take place and dilution with 150 grams of benzin while stirring is effected.

Having now described my invention what I claim and desire to secure by Letters Patent of the United States is:

1. A process for the manufacture of phenol-aldehyde resins soluble in fatty oil consisting in heating the resins obtained from phenols and aldehydes with substances soluble both in said resins and in turpentine until a resinous mass is obtained which remains clear when in a cold state, is soluble in fatty oils and is no longer precipitated from the solution in fatty oils when benzin or turpentine is added.

2. A process for the manufacture of phenol-aldehyde resins soluble in fatty oil consisting in heating the resins obtained from phenols and aldehydes with resins until a resinous mass is obtained remaining clear when in a cold state, soluble in fatty oils and no longer precipitated from the solution in fatty oils when benzin or turpentine is added.

3. A process for the manufacture of phenol-aldehyde resins soluble in fatty oil consisting in heating the resins obtained from phenols and aldehydes with fatty oils until a resinous mass is obtained remaining clear when in a cold state, soluble in fatty oils and no longer precipitated from the solution in fatty oils when benzin or turpentine is added.

4. A process for the manufacture of phenol-aldehyde resins soluble in fatty oil consisting in heating the resins obtained from phenols and aldehydes with a mixture of resins and fatty oils until a resinous mass is obtained remaining clear when in a cold state, soluble in fatty oils and no longer precipitated from the solution in fatty oils when benzin or turpentine is added.

5. A process for the manufacture of phenol-aldehyde resins soluble in fatty oil consisting in heating practically unmeltable phenol-aldehyde resins with substances soluble both in said resins and in oil of turpentine until a meltable resin is produced soluble in fatty oils and remaining clear when cold.

6. A process for the manufacture of phenol-aldehyde resins soluble in fatty oil consisting in heating practically unmeltable phenol-aldehyde resins with substances soluble both in said resins and in oil of turpentine at increased pressure until a meltable resin is produced soluble in fatty oils and remaining clear when cold.

7. A process for the manufacture of solutions of phenol-aldehyde resins with fatty oils consisting in heating the resins obtained from phenols and aldehydes with substances soluble both in said resins and in turpentine until a resinous mass is obtained remaining clear when cold, and then boiling said mass with a fatty oil until a solution is formed which permanently remains clear and miscible with oil of turpentine without clouding.

8. A process for the manufacture of solutions of phenol-aldehyde resins with fatty oils consisting in heating the resins obtained from phenols and aldehydes with small quantities of fatty oils until the resinous mass thus obtained remains clear when cold, and then boiling said resinous mass with further quantities of fatty oils with the addition of resins until a solution is formed which is miscible with turpentine oil without clouding and permanently remains clear.

9. A process for the manufacture of solutions of phenol aldehyde resins with fatty oils consisting in boiling the resins obtained from phenols and aldehyde with fatty oils while adding other resins until a solution miscible with turpentine oil and remaining permanently clear, is produced.

10. A process for the manufacture of solutions of phenol aldehyde resins with fatty oils consisting in heating until completely melted phenol resins with copals and boiling the phenol-resin copal mass thus obtained with fatty oils until a solution miscible with oil of turpentine and remaining permanently clear, is produced.

11. A process for the manufacture of solutions of phenol aldehyde resins with fatty oils consisting in heating until completely melted phenol resins with copals with the addition of fatty oil and boiling the phenol-resin copal mass thus obtained with fatty oils until a solution miscible with oil of turpentine and remaining permanently clear, is produced.

12. A process for the manufacture of solutions of phenol aldehyde resins with fatty oils consisting in heating phenols with a formaldehyde substance in the presence of a substance soluble both in phenol-aldehyde resins and in oil of turpentine until the resinous mass obtained thereby remains clear in the cold, and then boiling said mass with fatty oils.

In testimony whereof I have hereunto set my hand in presence of two subscribing witnesses.

LUDWIG BEREND.

Witnesses:
 JOHN B. BREWER,
 HEINRICH LUSTIG.